United States Patent
Dornhege et al.

(10) Patent No.: US 10,252,746 B2
(45) Date of Patent: Apr. 9, 2019

(54) METHOD FOR REDUCING STEERING TORQUE IN A STEERING SYSTEM OF A VEHICLE

(71) Applicant: Ford Global Technologies, LLC, Dearborn, MI (US)

(72) Inventors: Jens Dornhege, Pulheim (DE); Frank Peter Engels, Solingen (DE); Goetz-Phillipp Wegner, Dortmund (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/677,601

(22) Filed: Aug. 15, 2017

(65) Prior Publication Data

US 2017/0369096 A1 Dec. 28, 2017

Related U.S. Application Data

(63) Continuation of application No. 14/054,652, filed on Oct. 15, 2013.

(30) Foreign Application Priority Data

Oct. 16, 2012 (DE) .......................... 10 2012 218 836

(51) Int. Cl.
  *B62D 6/00* (2006.01)
(52) U.S. Cl.
  CPC .................................. *B62D 6/008* (2013.01)
(58) Field of Classification Search
  None
  See application file for complete search history.

(56) References Cited

U.S. PATENT DOCUMENTS

| | | | | |
|---|---|---|---|---|
| 6,873,891 B2 * | 3/2005 | Moser | ............... | B60G 17/0195 |
| | | | | 701/32.7 |
| 2002/0053481 A1 * | 5/2002 | Itakura | ................. | B62D 5/0463 |
| | | | | 180/446 |
| 2004/0030477 A1 * | 2/2004 | Gerdes | ............... | B60G 17/0185 |
| | | | | 701/48 |
| 2005/0049769 A1 | 3/2005 | Tsuchiya | | |
| 2009/0248250 A1 | 10/2009 | Yasui et al. | | |
| 2010/0211264 A1 * | 8/2010 | Wey | ......................... | B62D 6/00 |
| | | | | 701/41 |
| 2013/0211676 A1 | 8/2013 | Benyo et al. | | |
| 2013/0245893 A1 * | 9/2013 | Sprinzl | .................. | B62D 6/008 |
| | | | | 701/42 |
| 2014/0046548 A1 * | 2/2014 | Mukai | ..................... | B62D 6/08 |
| | | | | 701/42 |

FOREIGN PATENT DOCUMENTS

| | | |
|---|---|---|
| DE | 10323844 A1 | 12/2004 |
| DE | 102007055773 A1 | 6/2009 |
| DE | 102009000868 B4 | 12/2011 |

* cited by examiner

*Primary Examiner* — David P. Merlino
(74) *Attorney, Agent, or Firm* — Raymond L. Coppiellie; Burgess Law Office, PLLC

(57) ABSTRACT

A method for reducing the steering torque in a steering system of a vehicle. A method including the steps of monitoring a driver's torque as applied by a driver of the vehicle; providing a plurality of torques that can be imposed on the steering system; and reducing the torques that can be imposed on the steering system by a central reduction factor if monitoring of the steering system reveals a violation of a safety criterion.

5 Claims, 2 Drawing Sheets

METHOD FOR REDUCING STEERING TORQUE IN A STEERING SYSTEM OF A VEHICLE

CROSS-REFERENCE TO RELATED APPLICATIONS

Not Applicable.

BACKGROUND OF THE INVENTION

1. Field of the Invention

The invention relates to vehicle steering systems and, more specifically, to a method for controlling or reducing steering torque in a steering system of a vehicle.

2. Description of Related Art

Modern steering systems include assistance systems that enable the imposition of steering torque to provide driver comfort. Moreover, such assistance systems operate to reduce disturbing torque influences caused by the vehicle or the surface of the highway.

The steering wheel is the haptic interface to the driver and any imposed torque must be configured whereby it can be controlled by the driver. For example, if a fault occurs, such as an unintentional imposed torque, the driver's reaction remains an important non-negligible part of the overall system.

The impact of unfavorable torque impositions on the overall steering system if a fault occurs must be considered during the design of such assistance systems. Normally, the steering torque superimposed on the driver's torque by such assistance systems is limited in amplitude and dynamics. To determine controllable thresholds, customer clinics or expert clinics, i.e. studies or investigations, are carried out. Because of the variance of the assessments, the worst case must be assumed; i.e., the limitation must be oriented to the most critical case or to the most critical assessment if a fault occurs.

This means that the potential performance of additional functions or torque impositions cannot always demand torque useful or necessary for the respective situation.

For the regulation of steering assistance, there are various approaches to imposing additional torque to influence the overall system. These include the measurement value of the torque sensor (input torque), based on which the steering assistance is calculated, second the calculated steering assistance can be superimposed with an additional torque (output torque), and third both interfaces, which corresponds to a torque applied by the driver to the steering wheel (driver's torque).

The torque limitation described above must be oriented to the driver's torque to ensure controllability. This means that all limiting additional functions for providing the additional torque in the control loop have to calculate/determine the corresponding driver's torque.

This also applies to the functions that calculate the corresponding assist motor torque of the electronically assisted steering EPAS (output torque) for control/regulation and feed the same into the control loop. The calculation of the driver's torque is complex on the one hand and can frequently only be carried out roughly because of the complexity of the control loop. This can lead to loss of quality of the respective functions.

A combined limitation of the output torque and of the driver's torque is in general not possible, because both torques are not necessarily linearly dependent.

With a further approach, an estimate is carried out using the magnitude of the transverse dynamic reactions or yaw rates, which is directly related to the controllability assessment of the driver and hence takes into account the variables driver/vehicle/situation and enables a driver/vehicle/situation-dependent torque imposition, which enables maximum benefit for the respective function without violating the safety requirements. This means it will only be limited if the imposed torque leads to a corresponding critical vehicle reaction in the driver/vehicle/situation composite. Alternatively, a future yaw response can also be concluded from a steering angle response.

With the previously conducted limitation of the maximum permitted torque with respect to the driver's torque, all limiting additional functions have to calculate the driver's torque and feed this into the control loop. This is complex depending on the complexity of the steering control loop and can cause delays and inaccuracies. The quality of the additional steering functions can degrade because of this.

DE10 2009 000 868 B4 discloses a controller for a steering system having a plurality of steering functions, each of which directs a steering demand to the steering system. A logic circuit prioritizes the steering demands and inhibits any coincident steering demands, so that an overall level of the steering torque exerted by the steering system is not exceeded.

SUMMARY OF THE INVENTION

According to one example of the invention, a method for controlling steering system torque includes providing a sensor and using the sensor to detect a driver applied torque. The driver applied torque is monitored to determine the existence of a safety criterion violation. The method also includes providing a plurality of torque imposing units, with each torque imposing unit generating an imposed torque signal for use in imposing a torque in the steering system and reducing the imposed torque signals by a reduction factor in response to the safety criterion violation.

The invention proposes a new approach to the limitation of the driver's torque in relation to the permissible amplitude and dynamics. Using a reduction algorithm that returns the imposed torques, combined use of the assist motor torque interface and driver's torque interface is possible if a violation of the safe driving state is recognized. The reduction of all torques using a reduction factor according to the invention advantageously provides a method for the limitation of the torque independently of the steering control loop interface. This enables the use of all steering interfaces with a limiting function. The step of monitoring and/or plausibility checking can include, as described, the steering movements in relation to the driver's intention in the form of the torque applied by the driver and/or other criteria or parameters, with which a violation of the safe driving state can be recognized. Using a central or common reduction factor simplifies the control of the steering system or the reduction of steering torques of the steering system, because only one calculation has to be carried out. The safety criterion can include one or a plurality of limiting values for parameters or variables, which are monitored, such as e.g. the driver's torque applied by the driver of the vehicle.

If there is a violation, the torques that can be imposed or the requirements for torque impositions can be continuously reduced or the delivery of the torque can also be carried out continuously over a period, e.g. if the plausibility check is not carried out with calculated values but with measured values.

The reduction factor can comprise a hysteresis. This prevents oscillations of the reduction factor in the event of adaptation of the factor or in the event of a continuous flow of the method.

The monitoring can include the maximum permissible driver's torque and/or lateral dynamic reactions or yaw rates of the vehicle. These are variables that are simple to detect or are already known in the system. Other parameters can also come into use. It is important that a violation of the safe driving state can be recognized using the parameters.

Each torque that can be imposed can be reduced individually with the reduction factor or combined torques that can be imposed can be reduced together using the reduction factor. The reduction factor is used to reduce the summed imposed torques. To achieve this, each torque that can be imposed or each torque demand of the summed torque vector of an interface or torque vector can be individually reduced or multiplied by the reduction factor. The appropriate selection depends on the system used. The present method enables optimal adaptation to different situations or vehicles.

According to a second aspect of the invention, a controller for a steering system of a vehicle comprises a plurality of functional units for imposition of torques for functions of the steering system, a monitoring unit for monitoring a driver's torque applied by a driver of the vehicle and a reduction unit for the reduction of the torques that can be imposed by a central reduction factor depending on the monitoring. The above-described advantages and modifications apply.

The reduction unit can be in communication with each functional unit. Each additional function can be directly limited by the reduction unit without the additional functions having to calculate the limitation individually.

According to another aspect of the invention, a steering system of a vehicle comprises a controller as described above. The above-described advantages and modifications apply.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
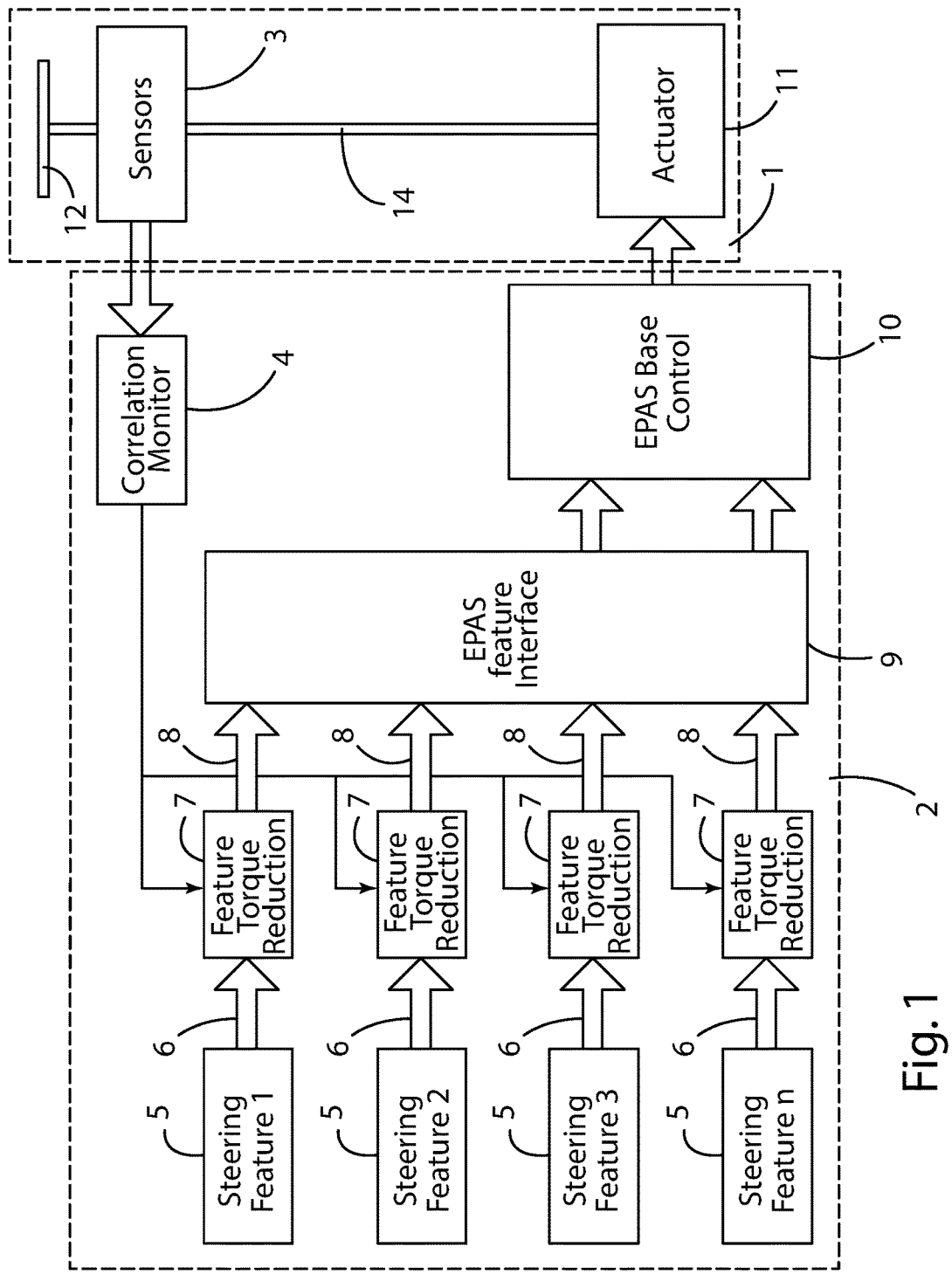
FIG. 1 shows a controller for a steering system of a vehicle according to the invention.

FIG. 1 shows a steering system 1 of a vehicle and a controller 2 for the steering system 1 schematically. For clarity, only components that are important for the explanation of the invention are illustrated here. As shown, a steering column 14 connects a steering wheel 12 connects to an actuator 11. One or a plurality of sensors 3 detects input applied to or through the steering wheel 12. The actuator 11 generating an output applied to or through the steering column 14 to the steering wheel 12.

One or a plurality of sensors 3, such as e.g. a sensor for detecting a driver's torque applied by a driver of the vehicle, is/are connected to a monitoring unit or a "correlation monitor" 4. The monitoring unit 4 monitors or plausibility checks the steering movements with respect to the driver's intention using the torque applied by the driver. Monitoring of the driver's torque applied by the driver of the vehicle takes place.

The steering system 1 or the controller 2 comprises a plurality of functional units 5 for imposing torques for functions of the steering system 1. These can be comfort and/or safety functions; for example, a functional unit 5 may impose a torque based on a determination of a corresponding assist value for such events as a crosswind, inclined road surface or speed sensitive steering. The functional units 5 produce torques that can be imposed 6, which are output to reduction units 7. The torques can be directly generated, wherein only a demand for a torque is generated in the normal case. The reduction units 7 are used for the reduction of the torques that can be imposed 6. The reduction is carried out using a central reduction factor, which is described in detail below in connection with FIG. 2.

The reduction units 7 are controlled by the monitoring unit 4. The torques that can be imposed 6 are reduced if monitoring reveals a violation of a safety criterion, i.e. if the plausibility check in the monitoring unit 4 signals a fault or a violation. The central reduction factor is then calculated and/or adapted. This can take place in the monitoring unit 4 and/or in the reduction units 7. The individual components such as the monitoring unit 4 and/or the reduction units 7 can be implemented in hardware and/or software in already existing systems such as an existing steering control. The reduction units 7 can be implemented in one unit or integrated in the functional units 5.

The reduction units 7 output a reduced or limited torque 8 or fully inhibit the output. The reduced torque 8 or the reduced demand is fed to a functional interface 9 of the electronic steering or an EPAS feature interface. The reduced torque 8 may be processed or converted for the controller 2 and be processed, converted and/or plausibility checked in a base unit 10 or EPAS base control.

The base unit combines the different reduced torques or demands 8. This can also be at least partly carried out in the interface 9. Finally, the base unit 10 outputs a control signal to an actuator or a control element 11 that generates the torque that is noticeable by the driver to the steering column or the steering wheel.

Figure 2:
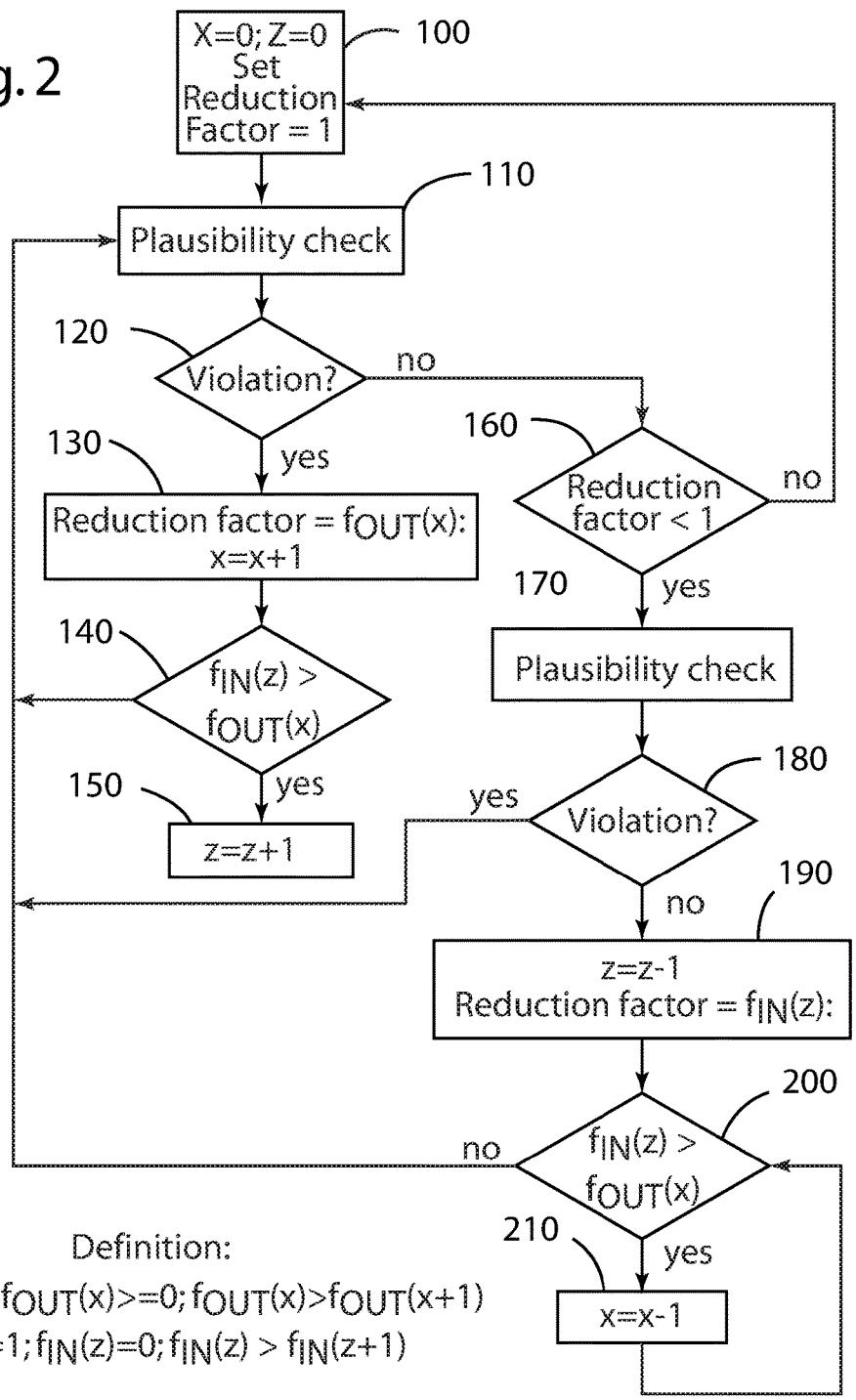
FIG. 2 shows a method for the reduction of steering torques of a steering system of a vehicle according to the invention.

Using FIG. 2, the reduction algorithm or the calculation of the central reduction factor is now described. Said algorithm or the calculation can take place in the monitoring unit 4, the reduction unit or units 7 or a different controller that may already be present and that has the required information available.

The reduction algorithm or calculation of the central factor includes two functions or equations $f_{OUT}$ and $f_{IN}$. $f_{OUT}$ represents the function to ramp out torque and $f_{IN}$ represents the function to increase torque once a violation ends. In the disclosed example $f_{OUT}$ is calibrated in a way to ramp out the torque fast if a violation is detected and $f_{IN}$ to increase the torque smoothly once a violation ends. Either function (equation/algorithm) may not be linear; it may describe any type of curve or parameters based on the particular vehicle or use intended. Each function describes a vector extending from 0 to 1 with its respective index value x, z setting forth a position on that vector wherein that position equates to the reduction factor. Assuming no violation of the plausibility check, the reduction factor always remains at 1, thus 1 times the applied torque is still the applied torque.

In a first initializing step 100, the counters or index values x and z used are set to zero. The following assumptions apply to the algorithm:

$f_{OUT}(0)=1$; $f_{OUT}(x)>=0$; $f_{OUT}(x)>f_{OUT}(x+1)$.
$f_{IN}(0)=1$; $f_{IN}(z)>=0$; $f_{IN}(z)>f_{IN}(z+1)$.

The result or output of the function $f_{OUT}$ and $f_{IN}$ may vary, depending upon the selected equation/algorithm, as long as it follows the limitations set forth in the definitions or assumptions previously set forth.

As illustrated, step 100 sets the reduction factor to 1. In a second step 110, the torque or a torque vector of the driver's torque and the central reduction factor are subjected to a plausibility check.

In another step 120, a check is carried out as to whether there is a violation of the safe driving state or a safety criterion. Said monitoring is oriented to the torque and possibly additionally to the reduction factor.

If there is a violation, the reduction factor index is increased in a step 130. The reduction factor can be described with respect to the duration of the violation of the plausibility check using a mathematical function $f_{OUT}(x)$. The index increase takes place with x=x+1. The reduction factor lies between zero and one. If there is a violation, and the index x increments by 1 which correspondingly lowers the value of the output of the reduction factor since $f_{OUT}(x)>f_{OUT}(x+1)$. The output of the function or the "reduction factor" must be less than 1. This is now less than $f_{IN}(z)$ which was initially set at 1. Accordingly, we index $f_{IN}(z)$ until the output is less than that of $f_{OUT}(x)$.

The insertion of the torques can be described by a separate function $f_{IN}(z)$. The functions $f_{OUT}(x)$ and $f_{IN}(z)$ are selected so the reduction of the torques by the reduction factor in the event of a violation of the plausibility check acts more strongly than the insertion of the torques can by the function $f_{IN}(z)$ and thus has a higher priority. This is ensured by the steps or blocks 140 and 150.

If the function $f_{OUT}(x)$ has more weight, branching back to step 110 occurs. This results in a control loop. This enables continuous reduction of the applied torque until complete locking if there is a violation of the plausibility check.

If the torque reduction is sufficient in order to no longer determine a plausibility violation, the reduction factor is frozen until an increase of the reduction factor no longer leads to a violation of the plausibility check.

If no violation is detected in step 120, a branch to step 160 takes place, in which it is queried whether the reduction factor is still less than one. If not, a branch occurs to step 100, in which the variables are reset.

If the reduction factor is less than one, in a step 170 a plausibility check is carried out for the torque and a reduced insertion of the torques is carried out with $f_{IN}(z-1)$. Here and in the following steps, checking and adaptation of the insertion $f_{IN}(z)$ take place similarly to steps 120 through 150.

In the event of a violation of said plausibility check in a step 180, a branch back to step 110 occurs. If this plausibility check is not violated, a branch occurs to step 190, in which the reduction factor is set as $f_{IN}(z)$, i.e. it enables insertion of the torques that can be imposed. In step 190, z is also decremented by 1. Subtracting 1 from the index value of z moves the reduction factor closer to 1. $f_{IN}$ is compared with $f_{OUT}$ and $f_{OUT}$ increments until $f_{OUT}$ becomes greater than $f_{IN}$ at which point the system returns to step 110 for a plausibility check. If no violation it then goes to step 160 wherein the reduction factor would be less than 1 which would cause it to reset to 1 in step 100.

In step 200, a check is made as to whether $f_{IN}$ is greater than the $f_{OUT}$. If this is not the case, branching back to step 110 occurs. If the insertion is greater, the index factor x is reduced by 1 in step 210 and branching back to step 200 occurs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A steering system of a vehicle comprising:
    a plurality of torque imposing units, each of said torque imposing units generating an imposed torque signal based on a selected steering event associated with the particular torque imposing unit whereby said torque imposing units cooperating with an actuator connected to a steering system component to impose a torque on the steering system;
    a sensor, said sensor detecting steering movements applied by a driver of the vehicle and generating an output based thereon;
    a monitoring unit, said monitoring unit receiving said sensor output and using said sensor output to recognize a violation of a safe driving state and generating a reduction factor based on the violation of the safe driving state; and
    a reduction unit, said reduction unit receiving said reduction factor from said monitoring unit, said reduction unit applying said reduction factor on each imposed torque signal to reduce each imposed torque signal and correspondingly reducing the imposed torque on the steering system.

2. The steering system of claim 1 wherein the reduction unit communicates individually with each torque imposing unit.

3. The steering system claim 1 including a plurality of reduction units each reduction unit paired and communicating with a corresponding torque imposing unit.

4. The steering system of claim 1 including an interface, said interface connected to and receiving each of said reduced imposed torque signal from said reduction unit;
    a base unit, said base unit connected to said interface, said base unit combining each reduced imposed torque signal and outputting a control signal based thereon to said actuator connected to the steering system component whereby said actuator generates the imposed torque in the steering system component.

5. A steering system of a vehicle comprising:
    a plurality of torque imposing units, each of said torque imposing units generating an imposed torque signal based on a selected steering event associated with the particular torque imposing unit;
    a sensor, said sensor detecting steering movements applied by a driver of the vehicle and generating an output based thereon;
    a monitoring unit, said monitoring unit receiving said sensor output and using the sensor to recognize a violation of a safe driving state and generating a reduction factor based on the violation of said safe driving state;

a reduction unit, said reduction unit receiving said reduction factor from said monitoring unit, said reduction unit applying said reduction factor on each imposed torque signal; and a base unit, said base unit combining each imposed torque signal and based on the combined imposed torque signal outputting a control signal to an actuator connected to a steering system component to correspondingly reduce a torque in the steering system component.

\* \* \* \* \*